(12) United States Patent
Erbe et al.

(10) Patent No.: US 10,989,896 B2
(45) Date of Patent: Apr. 27, 2021

(54) ADJUSTABLE MIRROR ASSEMBLY WITH LEAF SPRING ELEMENT

(71) Applicant: JENOPTIK Optical Systems GmbH, Jena (DE)

(72) Inventors: Torsten Erbe, Jena (DE); Frank Pacholik, Jena (DE)

(73) Assignee: Jenoptik Optical Systems GmbH, Jena (DE)

(*) Notice: Subject to any disclaimer, the term of this patent is extended or adjusted under 35 U.S.C. 154(b) by 108 days.

(21) Appl. No.: 16/299,781

(22) Filed: Mar. 12, 2019

(65) Prior Publication Data
US 2019/0285834 A1    Sep. 19, 2019

(30) Foreign Application Priority Data
Mar. 15, 2018  (DE) .......................... 102018106012.2

(51) Int. Cl.
*G02B 7/182* (2021.01)
(52) U.S. Cl.
CPC ............ *G02B 7/182* (2013.01); *G02B 7/1822* (2013.01)
(58) Field of Classification Search
CPC .......... G02B 7/1822; G02B 7/182–198; G02B 26/0816–0866
See application file for complete search history.

(56) References Cited

U.S. PATENT DOCUMENTS

| 6,293,682 B1* | 9/2001 | Kawaguchi ............ G02B 7/183 359/846 |
| 2008/0007702 A1 | 1/2008 | Kao |
| 2015/0219891 A1 | 8/2015 | Doerner |

FOREIGN PATENT DOCUMENTS

| DE | 2557814 B1 | 4/1977 |
| DE | 102011087331 A1 | 1/2013 |
| DE | 102012218769 A1 | 4/2014 |
| JP | 03150733 A | 6/1991 |
| JP | 09197234 A | 7/1997 |

OTHER PUBLICATIONS

German Examination Report dated Nov. 12, 2018.

* cited by examiner

*Primary Examiner* — Kimberly N. Kakalec
(74) *Attorney, Agent, or Firm* — Duane Morris LLP

(57) ABSTRACT

An adjustable mirror assembly comprising a mirror, a support, a leaf spring element biased between the support and a planar reverse side of the mirror, said leaf spring element generating a spring force, as well as at least two adjusting units mounted in the support and acting on the mirror in opposition to the spring force. The leaf spring element is mounted to the reverse side of the mirror via at least one mirror mounting point by a substance-to-substance bond and to the support via at least one support mounting point. The spring force is directed toward the support.

5 Claims, 4 Drawing Sheets

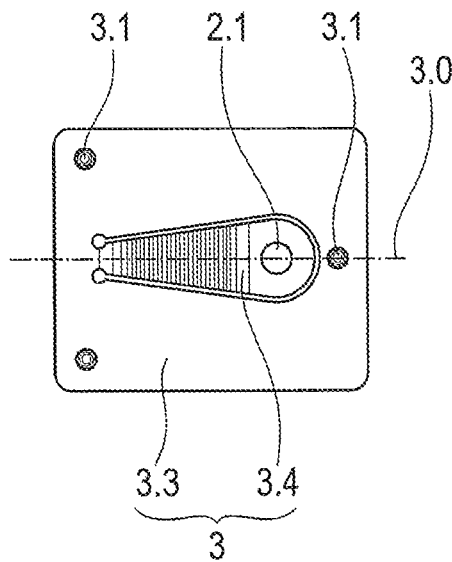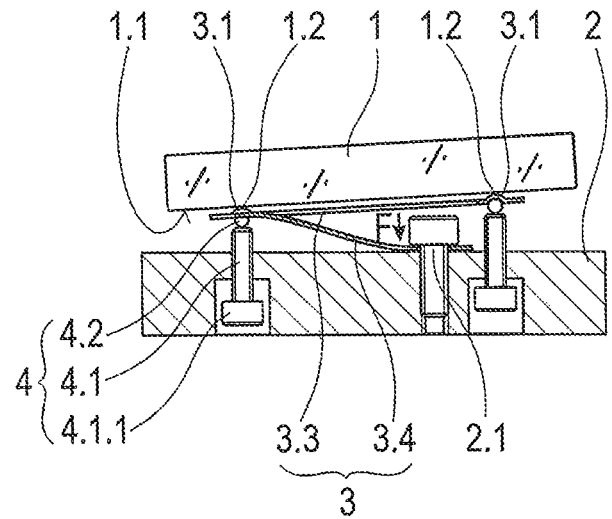
Fig. 5a  Fig. 5b
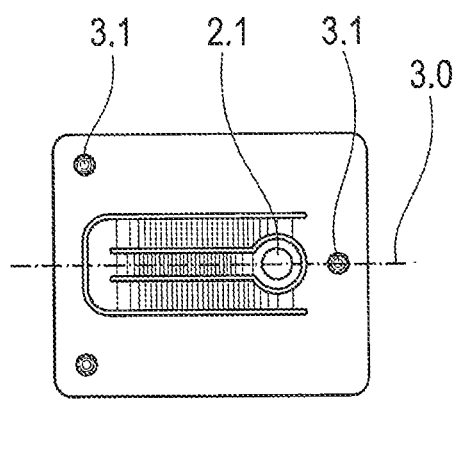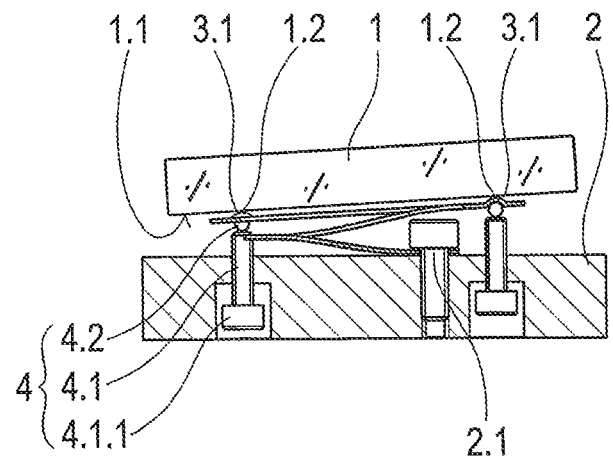
Fig. 6a  Fig. 6b

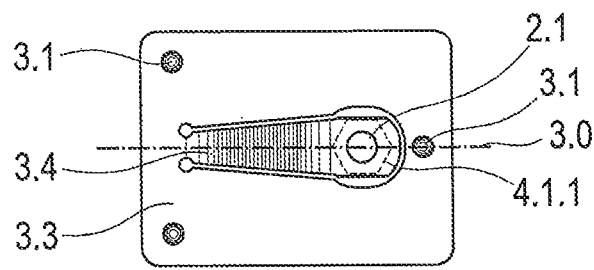
Fig. 7
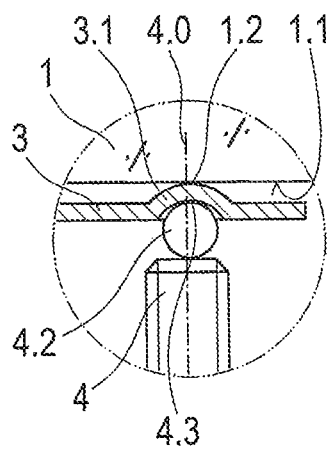
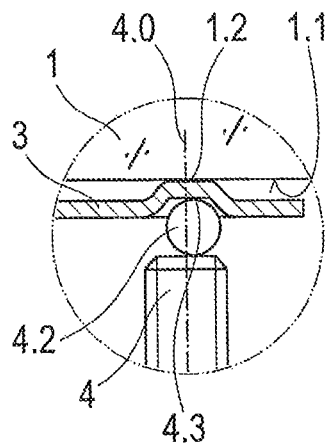
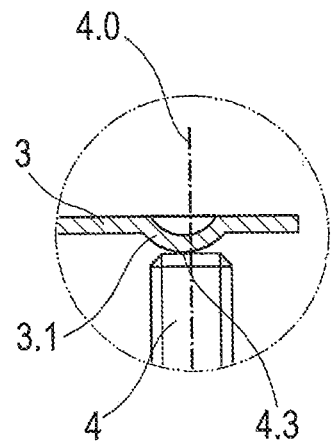
Fig. 8a   Fig. 8b   Fig. 8c
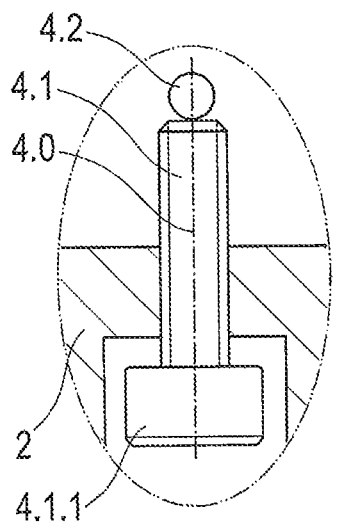
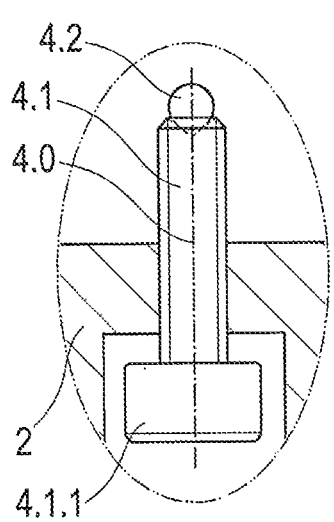
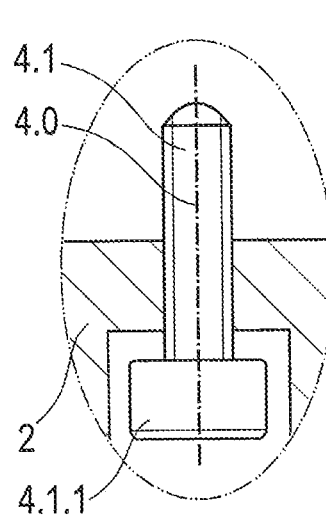
Fig. 9a   Fig. 9b   Fig. 9c

ADJUSTABLE MIRROR ASSEMBLY WITH LEAF SPRING ELEMENT

RELATED APPLICATIONS

The present application claims priority benefit of German Application No. DE 10 2018 106 012.2 filed on Mar. 15, 2018, the contents of which are incorporated by reference in its entirety.

FIELD OF THE INVENTION

The invention relates to an adjustable mirror assembly with a leaf spring element.

BACKGROUND OF THE INVENTION

A mirror assembly with a leaf spring element of the generic type described herein is known from published patent application JP H09197234 A. In this case, the mirror is mounted in the direction of its mirror axis between a three-point support contacting the mirror surface and a single-point support arranged centrally with respect to the three-point support and acting on the reverse side of the mirror. In addition, two lateral single-point supports contacting one of the peripheral surfaces of the mirror and extending parallel to two mounting points of the three-point support prevent rotation of the mirror about its mirror axis. By means of a leaf spring element, which is connected to the single-point support, a biasing spring force is transmitted to the mirror, so that the mirror is clamped between the single-point support and the three-point support. The clamping force is introduced at a small angle with regard to the mirror axis, so that part of the clamping force is always available to securely place the mirror with its peripheral surface against the two lateral single-point supports. One mounting point of the three-point support that is located opposite the two mounting points arranged parallel to the lateral single-point supports can be adjusted in the direction of the mirror axis. This makes the mirror adjustable about an axis perpendicular to the mirror axis, such adjustment always being performed within the range of the bias generated by the leaf spring. A disadvantage of this solution is that the mirror, due to being mounted between the central single-point support and the three-point support, is under a permanently introduced bending stress, which may impair the planarity of the mirror in optically demanding applications. Moreover, mounting the mirror requires more space at the mirror surface and on the reverse side of the mirror.

Published patent application DE 10 2011 087 331 A1 discloses an optical element comprising an optically active surface and connected to a carrier substrate by a substance-to-substance bond. The carrier substrate is adjustably connected to a holder, said connection being established by a ball as a central single-point support and by at least one clampable peripheral fixing element. The ball is received in a form-locking manner in a spherical recess of the support and of the holder, respectively, both recesses being complementary to each other in shape. The at least one fixing element establishes at least a force-fitting connection between the carrier substrate and the holder by applying a spring force. Since the optical element is indirectly connected to the holder via the carrier substrate, adjustment of the optical element is also performed via the carrier substrate. While this makes the optically active surface unlikely to be susceptible to forces applied by the fixing elements, such a construction cannot be achieved in a particularly space-saving manner.

Patent DE 25 57 814 B1 discloses a mirror which is freely suspended from two leaf spring elements of the same length. The first ends of the leaf spring elements are centrally connected to the reverse side of the mirror and form an axis of rotation at the center of mass of the mirror. The second ends of the leaf spring elements are mounted to a rigid holder at a distance from each other. A tilting movement of the mirror about the axis of rotation is achieved by means of suitably arranged driving coils and magnets which make the mirror oscillate. This device is not designed for long-term stable mounting and precise adjustment of the mirror.

JP H03 150 733 A discloses a mirror mounted on a support. The support comprising the mirror is mounted to a holder in a freely oscillating manner via a U-shaped leaf spring and a strip-shaped leaf spring, the support and the holder being spaced apart to accommodate the leaf springs. The leaf springs cross in an X-shaped manner, with the strip-shaped leaf spring being arranged in the intermediate space of the U-shaped leaf spring. The support comprising the mirror is stimulated to oscillate by means of driving coils and a magnet. This device is not designed for long-term stable mounting and precise adjustment of the mirror.

Published patent application DE 10 2012 218 769 A1 discloses an optical arrangement of a mirror and a support. The support is a monolithic component forming three elastically deflectable holding arms. Holding surfaces adhesively bonded to the reverse side of the mirror are arranged at the free ends of the supporting arms. The arrangement of the holding arms and holding surfaces with respect to the mirror is designed so as to accommodate thermal expansion of the mirror while keeping deformation of the optically active surface or changes in its position to a minimum. The optical arrangement is not designed for adjustment.

Published patent application US 2008/0007702 A1 discloses a mirror support which is mountable to a housing surface and adjustable thereon. The mirror support consists of a frame and a leaf spring whose base areas are adapted in accordance with the base area of the mirror. The frame has a recess on one side in which the mirror is accommodated and fixed. A plurality of lugs with threaded holes extending parallel to a mirror axis are arranged externally around the frame. The leaf spring has approximately the same base area as the frame including the lugs. It is arranged on a side of the frame facing away from the recess, between the frame and the housing surface. In a central area of the leaf spring, the frame is connected to the leaf spring in a planar manner. The leaf spring contacts the housing surface in the area of the lugs. There is a height difference between both areas which the leaf spring bridges with elastic areas. The mirror support is fixed to the housing surface by adjusting screws which are screwed into the threaded holes of the frame through the lugs of the leaf spring. The adjusting screws and the leaf spring allow the mirror to be tilted with respect to the housing surface. Disadvantageously, due to the lugs being arranged on the outside of the frame, the leverage between the positions of the adjusting screws and the central area of the leaf spring is long, so that bending stresses are introduced into the frame which may result in the mirror being deformed.

SUMMARY OF THE INVENTION

It is the object of the invention to provide a space-saving mirror assembly for mounting and adjusting a mirror, wherein the mirror can be mounted and adjusted with minimal application of force.

This object is achieved by an adjustable mirror assembly comprising the features of claim 1. Advantageous embodiments are set forth in the subclaims.

BRIEF DESCRIPTION OF THE DRAWINGS

The invention will be explained in more detail below with reference to exemplary embodiments and drawings. In the Figures:

FIG. 1a is a sectional view of a first exemplary embodiment of a mirror assembly according to the invention comprising a leaf spring element with a star-like shape;

FIG. 1b is a top view of the mirror with the leaf spring element of the mirror assembly of FIG. 1a;

FIGS. 5a-b show a top view and a sectional view of a fifth exemplary embodiment of a mirror assembly comprising a first nested leaf spring element;

FIGS. 6a-b show a top view and a sectional view of a sixth exemplary embodiment of a mirror assembly comprising a second nested leaf spring element;

FIG. 7 shows a leaf spring element, provided as a lock against rotation for an adjusting unit;

FIGS. 8a-8c show various embodiments of a coupling point, and

FIGS. 9a-9c; show various embodiments of an adjusting unit.

DETAILED DESCRIPTION OF EMBODIMENTS OF THE INVENTION

Figures 1A, 1B:
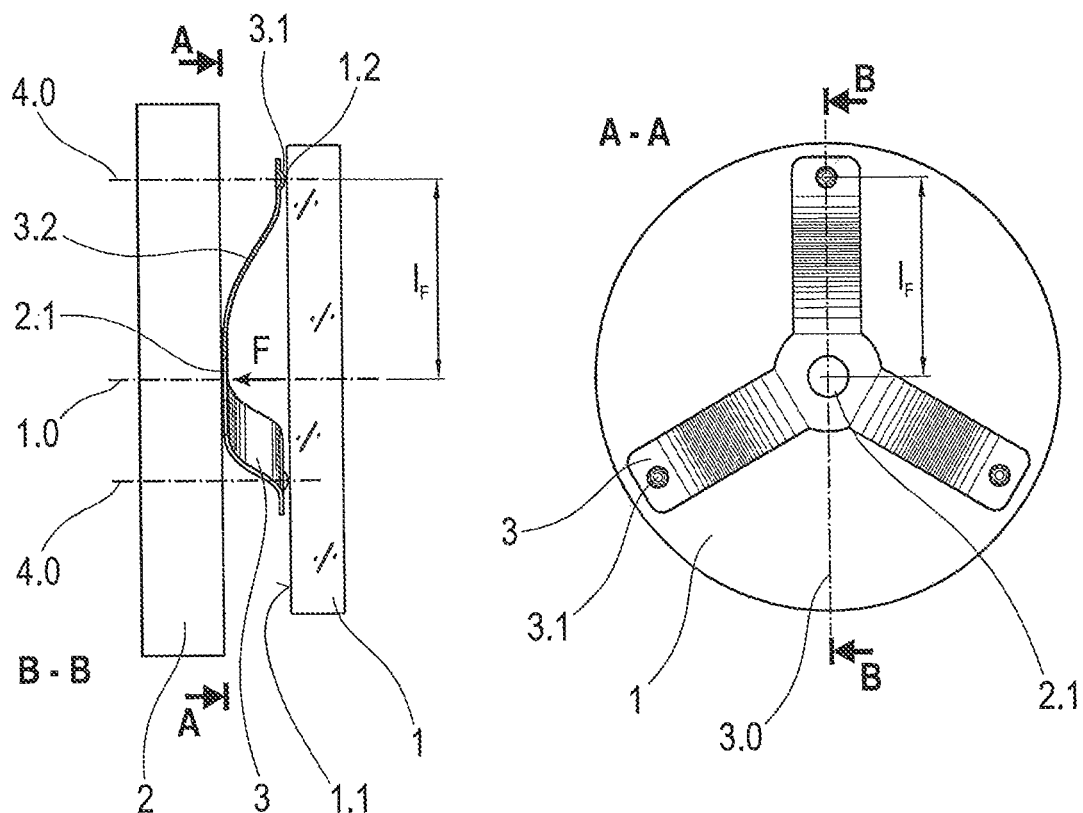

An adjustable mirror assembly substantially includes a mirror 1 with a mirror axis 1.0, a support 2, a leaf spring element 3 biased between the support 2 and a planar reverse side 1.1 of the mirror 1, said leaf spring element 3 generating a spring force F, and at least two adjusting units 4 mounted in the support 2 and acting on the mirror 1 in opposition to the spring force F.

It is essential to the invention that the leaf spring element 3 is mounted to the reverse side 1.1 of the mirror 1 via at least one mirror mounting point 1.2 by a substance-to-substance bond and to the support 2 via at least one support mounting point 2.1. The spring force F is directed toward the support 2, and the adjusting units 4 are each arranged at a respective coupling point 4.3 to act on the reverse side 1.1 of the mirror 1.

The leaf spring element 3 and the relative arrangement of the at least one support mounting point 2.1 with regard to a respective one of the at least one mirror mounting point 1.2 as well as the coupling points 4.3 are advantageously defined such that the spring forces F introduced into the mirror 1 via the at least one mirror mounting point 1.2 and the actuating forces introduced in a punctiform manner via the coupling points 4.3 are minimal so as to avoid clamping of the mirror 1. Ideally, for this purpose, the mirror 1 is indirectly connected to the support 2 via the leaf spring element 3. To this end, it is possible to fix the mirror 1 to the leaf spring element 3 by a substance-to-substance bond, in the sense of a material bond without overdeterminations, via one, three or six glue or solder points as mirror mounting points 1.2.

It is advantageous for the mirror mounting points 1.2 and the adjusting units 4 to be arranged such that, upon introduction of an adjusting movement, a minimal power flux forms between the substance-to-substance-bonded glue or solder points forming the mirror mounting points 1.2 and the adjusting units 4. A statically determined position is achieved by the number and arrangement as well as the design of the respective coupling points 4.3 between the leaf spring element 3 and one of the adjusting units 4. The pairing at the coupling points 4.3 is maintained by the biased leaf spring element 3.

As a result, the adjusting units 4 are preferably arranged to act indirectly on the reverse side 1.1 of the mirror 1 by contacting the leaf spring element 3.

Even more advantageously, the adjusting units 4 are each arranged to act on one of the mirror mounting points 1.2, which means that the coupling points 4.3 and the mirror mounting points 1.2 coincide.

Several exemplary embodiments of a mirror assembly according to the invention will be described below. They differ, in particular, in the geometric shape of the leaf spring elements 3, leading in particular to different spring lengths $l_F$ between a respective mirror mounting point 1.2 and a support mounting point 2.1 and different transformations of the adjustment travel introduced via the adjusting units 4 into a tilt angle by which the mirror 1 can be tilted, and thus adjusted, with respect to the support 2.

By way of example, some of the Figures supporting the exemplary embodiments show curvatures or humps of different shapes and curvature directions. The curvatures are advantageously formed at the mirror mounting points 1.2 and, in this case, serve to limit the cohesive bond by limiting the application of adhesive or solder during mounting to the convex curvature. There may also be curvatures at the coupling points 4.3 of the adjusting units 4. They enable a short power flux there and serve as bearings, as will be explained later. In the case of a mirror mounting point 1.2 and a coupling point 4.3 coinciding, the curvatures have a double function.

The Figures supporting the exemplary embodiments also show either no or more or less strong constrictions of different shapes at the leaf spring elements 3, said constrictions being respectively formed along a spring length $l_F$ to reduce the cross-section of the leaf spring elements 3. These constrictions weaken the leaf spring element 3 in cross-section along the spring length $l_F$. Thus, they have lower torsional resistance and allow tilting with a small change in actuating force. Advantageously, the spring length $l_F$, respectively between one of the at least one support mounting points 2.1 and one of the at least two mirror mounting points 1.2, and a minimum cross-sectional area along the respective spring length $l_F$ are matched to each other such that spring forces F act on the support mounting points 2.1 whose amounts differ from each other by no more than 10%.

The illustrated embodiments of the curvatures and constrictions are not restricted by the design of the leaf spring elements 3 and may be exchanged in the exemplary embodiments or not be present at all.

Also, the differently embodied adjusting units 4 shown by way of example in FIGS. 9a-9c for the exemplary embodiments may be exchanged.

FIGS. 1a and 1b show a first exemplary embodiment of a mirror assembly comprising a mirror 1, a support 2, three adjusting units 4 represented here only by their adjusting axis 4.0, and a first embodiment of a leaf spring element 3.

In this case, the leaf spring element 3 has a star-like shape with three points and comprises one support mounting point 2.1 at the center and three mirror mounting points 1.2 arranged with a mutual offset of 120° at the free ends of the points of the star. The spring length $l_F$ is the same between all mirror mounting points 1.2 and the support mounting point 2.1.

Figure 2:
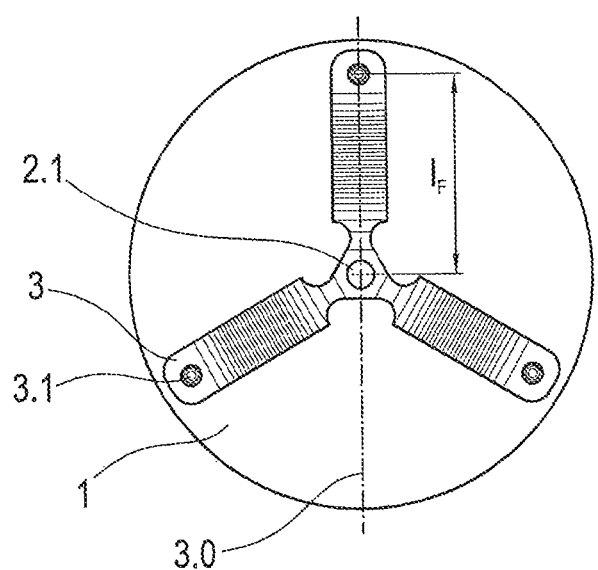
FIG. 2 is a top view of the mirror with a leaf spring element of a second exemplary embodiment of a mirror assembly with a star-like shape and constrictions at the base of each point of the star.

The second exemplary embodiment of a mirror assembly shown in FIG. 2 differs from the aforementioned exemplary embodiment only in that there are constrictions at each of the fixed ends of the points, or base of the points, of the leaf spring element 3, said constrictions allowing better tilting of the mirror 1 and, thus, lower-stress adjustment and fixture of the mirror 1. In this case, the adjusting units 4 are preferably designed such that they block two degrees of freedom each at the leaf spring element 3. Further advantageous embodiments of the leaf spring element 3 have a symmetrically branched structure starting from an axis of symmetry 3.0, and the mirror mounting points 1.2 and the support mounting point 2.1 are arranged at ends of individual leaf spring branches 3.2 of the branched structure. Thus, the spring length $l_F$ between a respective one of the mirror mounting points 1.2 and the at least one support mounting point 2.1 is greater than in the case of an unbranched leaf spring element 3 of the same circumferential shape and size, so that a movement of the mirror 1 perpendicular to the mirror axis 1.0 is comparatively smaller for the same adjustment travel introduced axially into one of the mirror mounting points 1.2.

Figure 3:
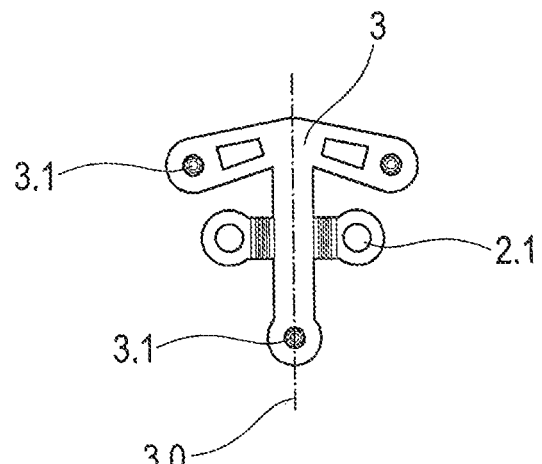
FIG. 3 is a top view of a leaf spring element of a third exemplary embodiment of a mirror assembly with a first anchor-like shape.
Figure 4:
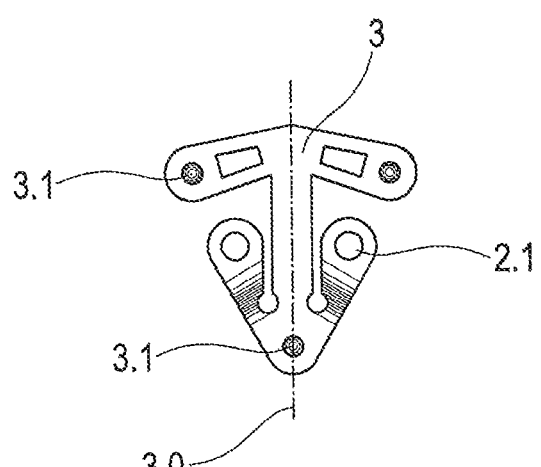
FIG. 4 is a top view of a leaf spring element of a fourth exemplary embodiment of a mirror assembly with a second anchor-like shape.

FIG. 3 and FIG. 4 show the leaf spring elements 3 for third and fourth exemplary embodiments of the mirror assembly, which are shaped like anchors in this case. Great spring lengths $l_F$ are achieved here on a comparatively small peripheral surface. These embodiments are advantageous, in particular, if the mirror assembly is subject to thermal stresses and the materials of the support 2 and of the mirror 1 have different expansion coefficients. The leaf spring elements 3 have a mirror-symmetrical configuration and include two support mounting points 2.1 arranged symmetrically with respect to an axis of symmetry 3.0. In contrast to the first two exemplary embodiments, a geometrically determined zero point results here, around which the mirror assembly can move thermally, which zero point does not coincide with the support mounting point 2.1 and is, thus, not subject to frictional load.

In the fifth and sixth exemplary embodiments of the mirror assembly shown in FIGS. 5*a-b* and FIGS. 6*a-b*, the leaf spring elements 3 have a nested structure, wherein a rectangular leaf spring is divided by separating cuts and/or cutouts into a leaf spring frame 3.3 and at least one framed leaf spring tongue 3.4. The mirror mounting points 1.2 are arranged at the leaf spring frame 3.3 and the one support mounting point 2.1 is arranged at a free end of the leaf spring tongue 3.4. Thus, the spring length $l_F$ between a respective one of the mirror mounting points 1.2 and the at least one support mounting point 2.1 is greater than in the case of a leaf spring element 3 of the same circumferential shape and size that is not nested. Thus, a movement of the mirror 1 perpendicular to the mirror axis 1.0 is comparatively smaller for the same adjustment travel introduced axially into one of the mirror mounting points 1.2.

The leaf spring element 3 shown in FIGS. 5*a-b* is divided by separation cuts into a leaf spring frame 3.3 and an internal leaf spring tongue 3.4 and is formed symmetrically with respect to an axis of symmetry 3.0. The leaf spring element 3 shown in FIGS. 6*a-b* comprises another leaf spring tongue 3.4 integrated within the leaf spring tongue 3.4, thereby achieving, in particular, an even greater spring length 1F. Both of these Figures show the adjusting units 4 respectively acting on a mirror mounting point 1.2. Specifically, in this case, the leaf spring element 3 has a curvature 3.1 at each of the mirror mounting points 1.2 and the adjusting units 4 each comprise a screw 4.1 and a ball 4.2 located in the curvature 3.1, as is shown more clearly in FIG. 8*a*.

Further advantageous embodiments of the adjusting units 4 are shown in FIG. 9*a* and FIG. 9*b*. Advantageously, the adjusting units 4 are screws 4.1 which, screwed through the support 2 contact the mirror 1 either directly or indirectly, via a ball 4.2 or a spherical section directly on the reverse side 1.1 of the mirror 1, or indirectly via the leaf spring element 3.

According to an embodiment shown in FIG. 9*a*, an end of the screw 4.1 facing away from the screw head 4.1.1 has a planar shape, and a ball 4.2 contacting the planar surface is held at the coupling point 4.3, as shown in FIG. 8*a*, perpendicular to the mirror axis 1.0 in a curvature 3.1 in the leaf spring element 3. If the ball 4.2 is held in a curvature 3.1, the latter must allow the ball 4.2 to move freely in a direction perpendicular to the mirror axis 1.0, as shown in FIG. 8*b*, so as not to get jammed when tilting the mirror 1 via other ones of the adjusting units 4. Alternatively, as shown in FIG. 8*c*, it is also possible to form a curvature 3.1 at the coupling point 4.3, which curvature 3.1 is convex toward the screw 4.1 and on which the planar end of the screw 4.1 can slide.

According to an embodiment shown in FIG. 9*b*, the end of the screw 4.1 facing away from the screw head 4.1.1 has a recess, preferably with a conical shape, and the ball 4.2 is retained at the coupling point 4.3 by said recess.

The embodiment of an adjusting unit 4 shown in FIG. 9*c* is provided with a spherical shape at the end facing away from the screw head 4.1.1, i.e. a spherical section is formed monolithically thereon. The advantage of the monolithic or solid connection is that it requires no measures whatsoever to keep the ball 4.2 at the coupling point 4.3. A loose ball 4.2 in turn has the advantage that it can roll away during adjustment of the other adjusting unit 4, which leads to excursion of the coupling point 4.3.

In FIGS. 1, 5*b* and 6*b*, the coupling points 4.3 each coincide with the mirror mounting points 1.2, which is particularly advantageous. The same may apply to the other exemplary embodiments. Also, all embodiments may be modified such that the coupling points 4.3 contact mirror mounting points 1.2 other than those at the leaf spring element 3 or even directly contact the reverse side 1.1 of the mirror 1.

The mirror assembly is preferably provided for a use in which the mirror 1 is arranged horizontally, i.e. the mirror axis 1.0, which coincides with the surface normal in the case of a planar mirror, extends vertically. In this case, gravity causes the mirror 1 to contact the adjusting units 4 with an identical contact force. The leaf spring element 3 is configured such that the spring force F respectively acting on the coupling points 4.3 prevents lifting from the adjusting units 4. Depending on the operating and transport loads, this may result in a stress approximately 8 to greater than 30 times the effective gravity of the mirror 1, distributed over the number of adjusting units 4.

The particular advantage of a mirror assembly according to the invention is its small space requirement perpendicular to the mirror axis 1.0, which constitutes the axis of symmetry 3.0 in the case of a round mirror 1. Moreover, said mirror assembly enables statically determined, i.e. neither overdetermined nor underdetermined, mounting of the mirror 1.

And, due to functional integration, said mirror assembly requires comparatively few components, because the actual mount, formed by the leaf spring element 3, simultaneously also serves as a biasing element for the adjusting units 4 to ensure secure positioning.

In the case of the embodiment of the leaf spring elements 3 in a nested structure in the embodiment of the adjusting unit 4 as a screw 4.1 with an angular screw head 4.1.1, the leaf spring element 3 may also assume the function of secure positioning of the screw 4.1, in that, as shown in FIG. 7, the screw head 4.1.1 is arranged in the structure in a form-locking manner, e.g. in the leaf spring frame 3.3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 mirror
1.0 mirror axis
1.1 reverse side (of the mirror 1)
1.2 mirror mounting point
2 support
2.1 support mounting point
3 leaf spring element
3.0 axis of symmetry (of the leaf spring element 3)
3.1 curvature
3.2 leaf spring branch
3.3 leaf spring frame
3.4 leaf spring tongue
4 adjusting unit
4.0 adjusting axis
4.1 screw
4.1.1 screw head
4.2 ball
4.3 coupling point
F spring force
$l_F$ spring length

What is claimed is:

1. An adjustable mirror assembly comprising a mirror having a mirror axis, a support, a leaf spring element biased between the support and a planar reverse side of the mirror, said leaf spring element generating a spring force, and at least two adjusting units mounted in the support and acting on the mirror in opposition to the spring force, said leaf spring element being mounted to the reverse side of the mirror in at least one mirror mounting point by a substance-to-substance bond and to the support in at least one support mounting point, the spring force being directed toward the support, and the adjusting units each being arranged at a coupling point to act on the reverse side of the mirror, wherein the adjusting units are arranged to act indirectly on the reverse side of the mirror by contacting the leaf spring element, and wherein the adjusting units are each arranged to act on one of the mirror mounting points, and wherein the leaf spring element has a curvature at each of the mirror mounting points and the adjusting units each comprise a screw and a ball located in the curvature.

2. The adjustable mirror assembly according to claim 1, wherein a spring length, respectively between one of the at least one support mounting points and one of the at least two mirror mounting points, and a minimum cross-sectional area along the respective spring length are matched to each other such that spring forces act on the support mounting points whose amounts differ from each other by no more than 10%.

3. The adjustable mirror assembly according to claim 2, wherein the leaf spring element has a symmetrically branched structure starting from an axis of symmetry, and the mirror mounting points and the support mounting point are arranged at the ends of individual leaf spring branches of the branched structure, such that the spring length between a respective one of the mirror mounting points and the at least one support mounting point is greater than in the case of an unbranched leaf spring element of the same circumferential shape and size, so that a movement of the mirror perpendicular to the mirror axis is comparatively smaller for the same adjustment travel introduced axially into one of the mirror mounting points.

4. The adjustable mirror assembly according to claim 2, wherein the leaf spring element has a nested structure, wherein a rectangular leaf spring is divided by separating cuts and/or cutouts into a leaf spring frame and a framed leaf spring tongue, and the mirror mounting points are arranged at the leaf spring frame and the one support mounting point is arranged at the free end of the leaf spring tongue, such that the spring length between a respective one of the mirror mounting points and the at least one support mounting point is greater than in the case of a leaf spring element of the same circumferential shape and size that is not nested, so that a movement of the mirror perpendicular to the mirror axis is comparatively smaller for the same adjustment travel introduced axially into one of the mirror mounting points.

5. The adjustable mirror assembly according to claim 1, wherein the screw has an angular screw head which is secured in position in a leaf spring frame in a form-locking manner.

* * * * *